United States Patent [19]
Dols

[11] Patent Number: 5,169,076
[45] Date of Patent: Dec. 8, 1992

[54] CRUSHING TOOL

[75] Inventor: Robert Dols, Mentone, Australia

[73] Assignee: Escam Pty. Ltd., Australia

[21] Appl. No.: 706,930

[22] Filed: May 30, 1991

[30] Foreign Application Priority Data

Jun. 1, 1990 [AU] Australia ............................. PK 0444

[51] Int. Cl.⁵ ............................................. A47J 43/26
[52] U.S. Cl. .................... 241/169; 30/120.5; 241/DIG. 17
[58] Field of Search ........................ 241/169, DIG. 17; 30/120.2, 120.5; 81/355, 356, 362, 126, 128

[56] References Cited

U.S. PATENT DOCUMENTS 2,526,273 10/1950 Rimes .................................. 30/120.5
2,543,886 3/1951 Brookey .............................. 30/120.5

FOREIGN PATENT DOCUMENTS 1237620 6/1988 Canada ............................... 30/120.2

Primary Examiner—Douglas D. Watts
Attorney, Agent, or Firm—Andrus, Sceales, Starke & Sawall

[57] ABSTRACT

A crusher comprises a housing defining a crushing chamber for restraining an object to be crushed and a plunger for applying force on the object to be crushed when the plunger is actuated by a handle. The handle is mounted on the housing for pivotal movement about a first floating pivot in a first pivotal direction which actuates a first engaging element to move the plunger in a first direction to crush the object in the crushing chamber. The plunger is locked against resilient return in a second direction by a second engaging element. Further pivotal movement of the handle about a second floating pivot in a second pivotal direction actuates the disengagement of the second engaging element, causing the return of the plunger.

9 Claims, 6 Drawing Sheets

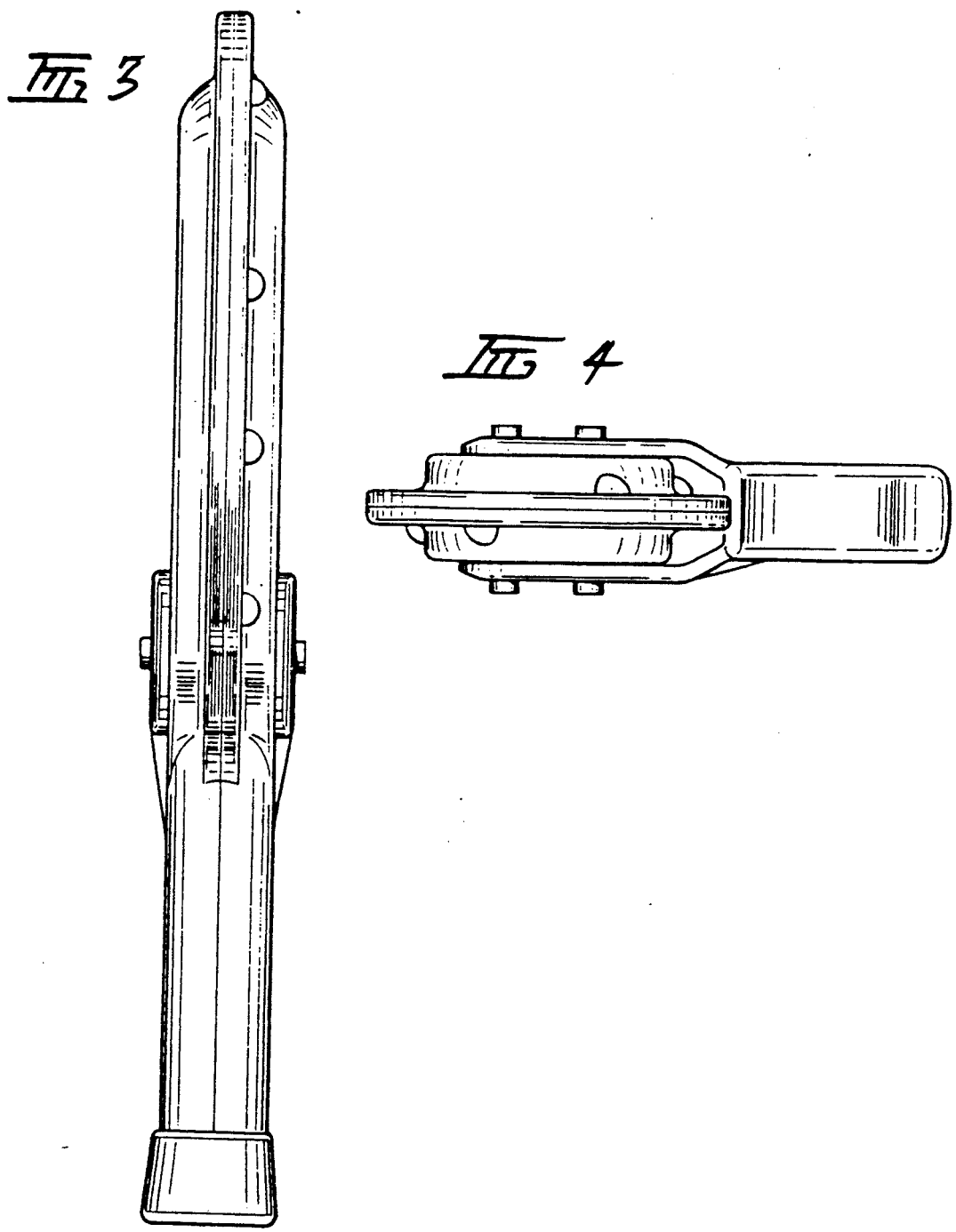

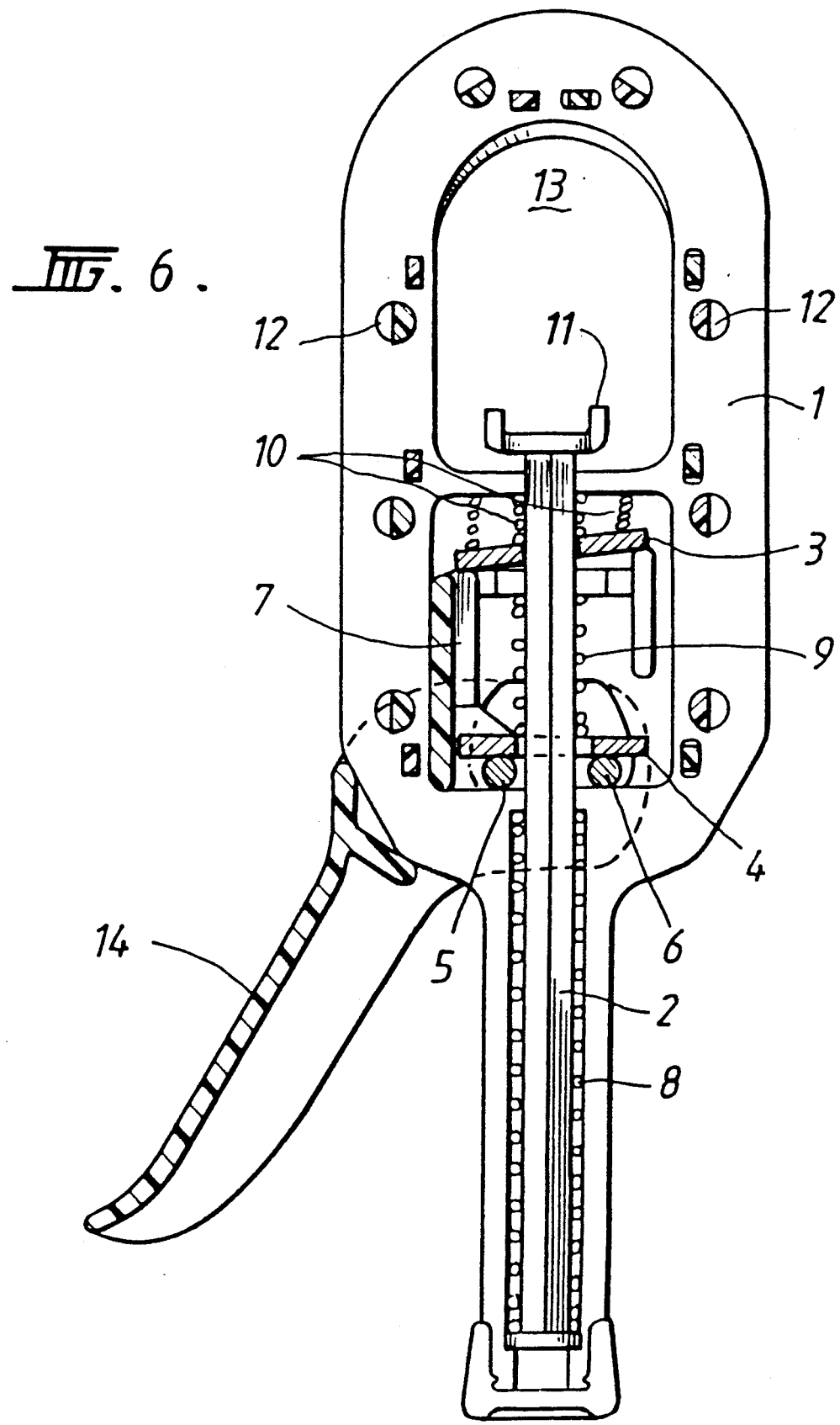

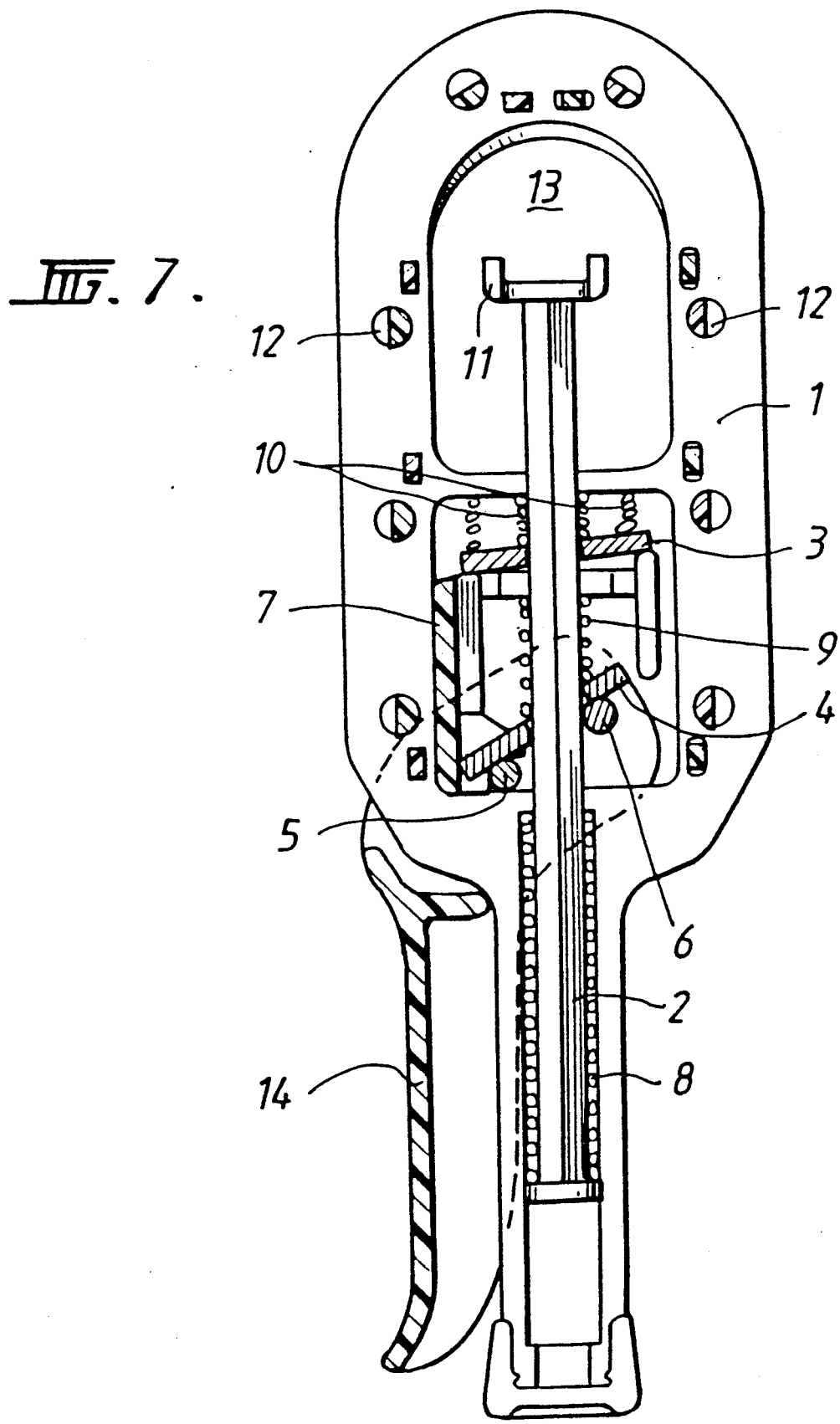

CRUSHING TOOL

INTRODUCTION TO INVENTION

This invention relates to a crushing tool and in particular to an improved tool for cracking nuts, ice cubes and the like.

BACKGROUND OF INVENTION

Pressure application or crushing tools come in a wide range of types adapted for a wide range of applications. The breadth of application is such that the range of specialised tools available for the domestic market is quite bewildering.

Among the type of tools available are nut crackers, ice crushers, bottle top openers, etc. and although all the these perform their individual functions satisfactorily, a general purpose tool capable of performing these and other individual functions has yet to be developed.

In particular an improved tool capable of performing a range of functions with greater efficiency is clearly needed.

To date nut cracking tools have relied on screw or lever type devices and often have inadequate force delivery or precision. Certain types of nuts like Macadamia nuts present special problems due to their shape and hardness.

OBJECTS AND STATEMENT OF INVENTION

The object of the present invention is to provide an improved crushing tool in particular an improved nut cracker.

Accordingly the invention provides a crusher comprising housing defining a crushing chamber for restraining an object to be crushed and a plunger entering said chamber for applying a crushing force on said object when said plunger is actuated by a handle, characterised in that, said handle is mounted on said housing for pivotal movement about a first floating pivot where pivotal movement of said handle in a first pivotal direction actuates a first engaging means to move the plunger in a first direction to crush an object in the crushing chamber where said plunger is locked against resilient return in a second direction by a second engaging means, and further characterised in that said handle in adapted for a further pivotal movement about a second floating pivot where further pivotal movement of said handle in a second pivotal direction actuates the disengagement of the said second engagement means, effecting the resilient return of the plunger.

Preferably the actuation of the first engaging means is effected by the second floating pivot acting as an actuating pin; and the actuation of the second engaging means is effected by the first floating pivot acting as an actuating pin.

Preferably the handle is mounted to straddle either side of the housing by two integral arms which engage said first and second floating pivots.

Preferably the handle is adapted to operate the movement of the plunger in the said first direction by squeezing toward the housing.

Preferably the handle is adapted to operate the return movement of the plunger in the second direction by lifting away from the housing.

Preferably the plunger, and the first and second engaging means are resiliently held in place by springs.

Preferably the first and second engaging means incorporate a hole through which the plunger passes wherein movement of the engaging means into a plane other than that normal to the hole causes the engaging means to bite into the plunger thereby effecting engagement.

Preferably the plunger incorporates teeth in the form of a rack to facilitate engagement of the engaging means.

Preferably the plunger is hexagonal in cross-section.

BRIEF DESCRIPTION OF THE DRAWING

FIG. 3 represents an edge view.

FIG. 4 represents an end view.

FIG. 6 represents a cross-sectional view showing the device in a the locking mode.

FIG. 7 represents a cross-sectional view showing the device in a crushing mode.

DETAILED DESCRIPTION

The invention will now be described in more detail with reference to a particularly preferred embodiment as detailed in FIGS. 1 to 7.

Figure 1:
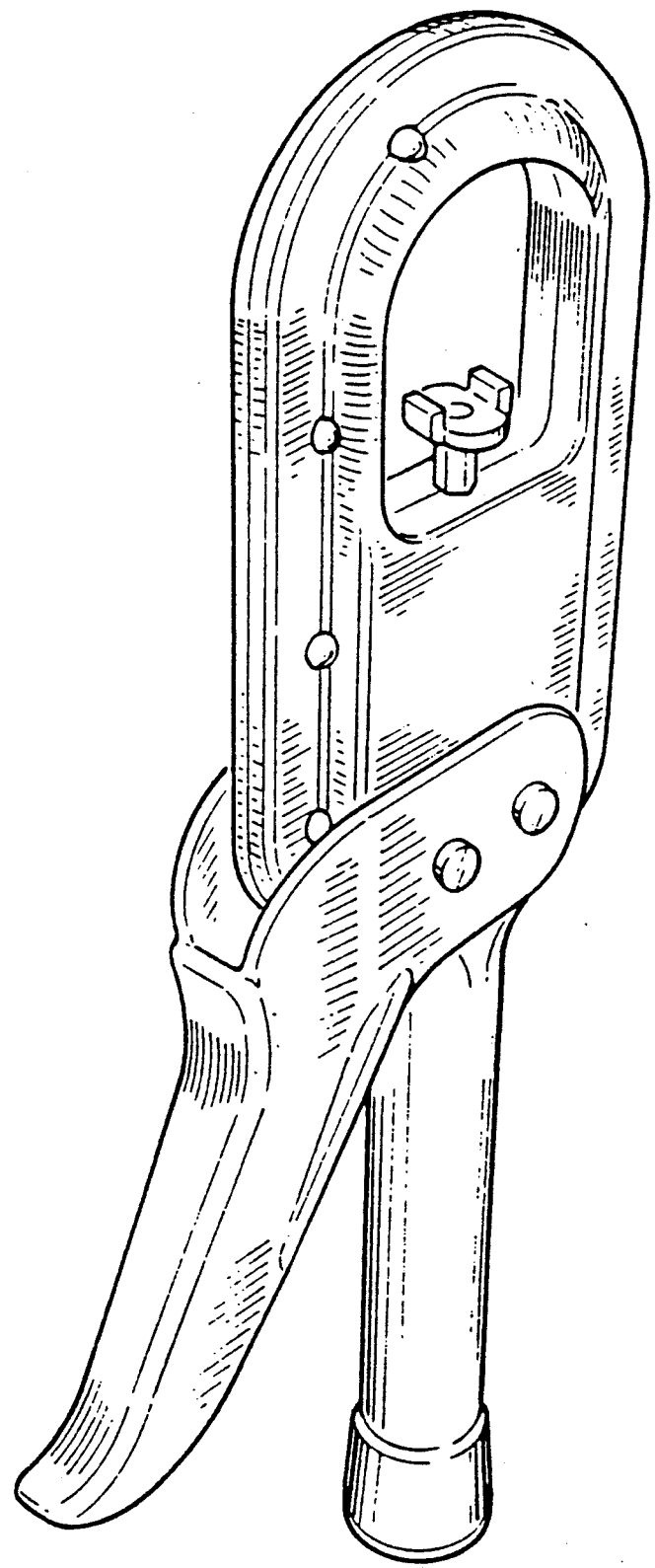
FIG. 1 represents a perspective view of one embodiment of the invention.
Figure 2:
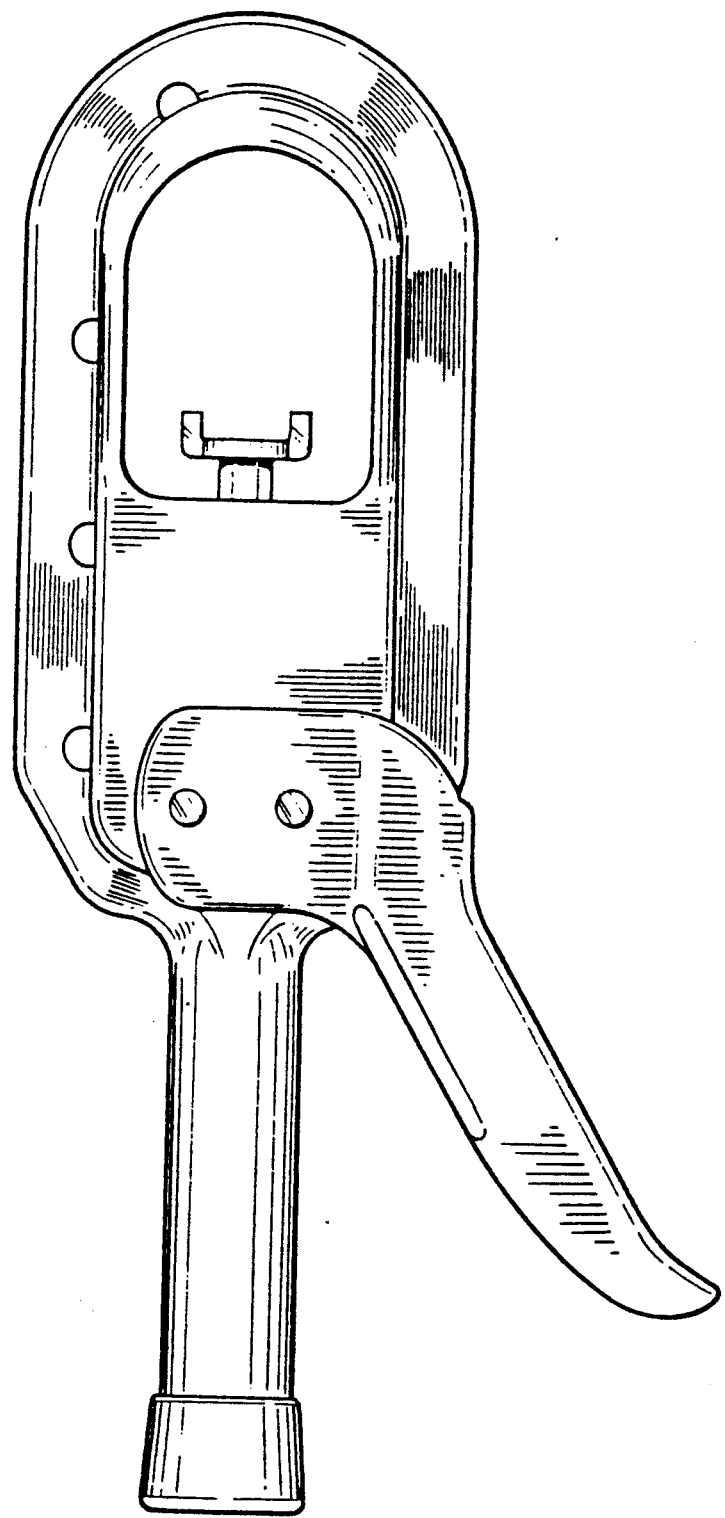
FIG. 2 represents a plan view.
Figure 5:
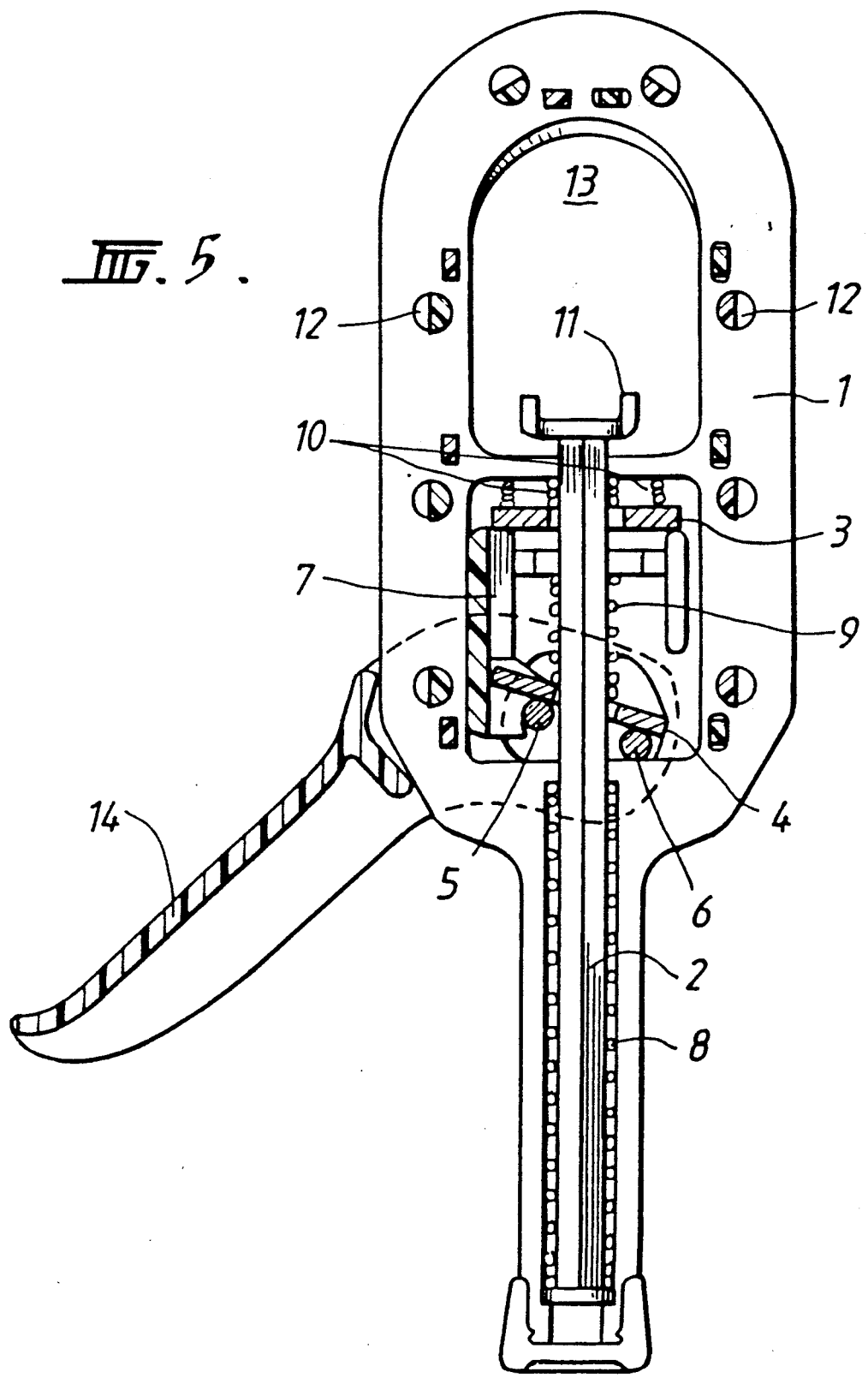
FIG. 5 represents a cross-sectional view showing the device in a release mode.

FIGS. 5 to 7 show the crusher wherein the main body housing 1 comprises two mating halves having mirror image shape and being adapted to snap together by way of lugs 12. Within the housing 1, the plunger 2 occupies a central position being capable of longitudinal movement in a forward, hereinbefore called the first direction, where the plunger head 11 closes up the chamber cavity 13. The plunger is also movable in a reverse, hereinafter called the second direction, wherein the plunger may be returned to the back of the chamber.

Referring now to FIG. 7, the crushing mode of the tool is detailed wherein the plunger 2 is activated by way of a first engaging means 4 and prevented from returning against spring 8 by the second engaging means 3 which acts as a locking means. The engaging means 3 is positioned by resilient springs 10 which bias for engagement until the transfer member 7 causes disengagement. The engaging means 4 is activated by the forward movement in a first direction of the second floating pivot 6 in a float mode as moved by handle 14 pivoting about the first floating pivot 5 which is in a pivot mode.

The plunger 2 moves forward as the handle is compressed in a direction toward the housing and as the plunger moves forward spring 8 goes into compression. The plunger is prevented from returning by the second engaging means 3 which locks the plunger.

Referring now to FIG. 5, the plunger may be released by opening the handle. The second floating pivot 6 now acts as a pivot with the first floating pivot 5 acting as a float wherein the transfer member 7 disengages the second engagement means 3 whence the plunger returns to the back of the crusher under the action of spring 8.

Referring to FIG. 6, the intermediate or locked action of the tool can be seen as effected by the engagement of the plunger 2 by the second engagement means 3 which prevents the plunger returning under the action of spring 8.

As can be seen from the description, the crusher of the instant invention has clear advantages over the prior art. Particularly, the crusher is versatile in that virtually anything that can be fitted into the chamber can be crushed. The device may also be used in open bottles, etc.

The device is a compact, strong and reliable unit and suffers from none of the problems of the prior art.

I claim:

1. A crusher comprising:

a housing defining a crushing chamber for restraining an object to be crushed;

a plunger entering said chamber for applying a crushing force on the object when moved in a first direction;

resilient means for moving said plunger in a second direction, opposite said first direction;

a handle mounted on said housing for movement with respect to said housing in a first pivotal direction and for movement with respect to said housing in a second pivotal direction, opposite said first pivotal direction;

first floating pivot means coupled to said handle and movable with respect to said housing;

first engaging means for engaging said plunger responsive to movement of said handle about said first floating pivot means in the first pivotal direction to move said plunger in the first direction to cause said plunger to apply a crushing force on the object in the chamber;

second engaging means for engaging said plunger for locking said plunger against movement in the second direction; and second floating pivot means coupled to said handle and movable with respect to said housing, movement of said handle about said second floating pivot means in the second pivotal direction disengaging said second engaging means from said plunger for allowing said resilient means to move said plunger in the second direction.

2. A crusher according to claim 1 wherein said second floating pivot means actuates said first engaging means to engage said plunger responsive to movement of said handle about said first floating pivot means in the first pivotal direction and wherein said first floating pivot means actuates said second engaging means to disengage said plunger responsive to movement of said handle about said second floating pivot means in the second pivotal direction.

3. A crusher according to claim 1 wherein the handle has two integral arms mounted to straddle either side of the housing and which engage said first and second floating pivot means.

4. A crusher according to claim 1 wherein the handle is adapted to effect the movement of the plunger in the said first direction by squeezing towards the housing.

5. A crusher according to claim 1 wherein the handle is adapted to effect the movement of the plunger in the second direction by lifting away from the housing.

6. A crusher according to claim 1 wherein said plunger and said first and second engaging means have spring means operatively associated therewith.

7. A crusher according to claim 1 where the first and second engaging means each have a hole through which the plunger passes, and wherein movement of the engaging means into a plane other than that normal to the plunger causes the engaging means to bite into the plunger thereby effecting engagement.

8. A crusher according to claim 1 wherein the plunger has teeth in the form of a rack to facilitate engagement of the engaging means.

9. A crusher according to claim 1 wherein the plunger is hexagonal in cross-section.

* * * * *